United States Patent [19]

Saito et al.

[11] 4,000,110

[45] Dec. 28, 1976

[54] METHOD OF PRODUCING A CERAMIC ARTICLE BY INJECTION MOLDING

[75] Inventors: Kazumi Saito; Toshiya Tanaka; Takezo Hibino, all of Kyoto, Japan

[73] Assignees: Kazumi Saito; Toshiya Tanaka, both of Tokyo, Japan; Tokyo Shibaura Electric Co., Ltd., Tokyo, Japan

[22] Filed: Apr. 15, 1975

[21] Appl. No.: 568,281

Related U.S. Application Data

[62] Division of Ser. No. 448,063, March 4, 1974, abandoned.

[30] Foreign Application Priority Data

Mar. 5, 1973 Japan .................. 48-26479

[52] U.S. Cl. ............... 260/42.11; 106/41; 264/63
[51] Int. Cl.$^2$ ............... C08K 3/22
[58] Field of Search ........... 260/42.11, 42.13; 264/29, 122, 125, 126, 331, 333, 63; 106/41

[56] References Cited

UNITED STATES PATENTS

| | | | |
|---|---|---|---|
| 3,285,873 | 11/1966 | Bailey | 260/42.11 |
| 3,297,805 | 1/1967 | Rottig | 264/126 |
| 3,366,498 | 1/1968 | Osborne | 264/63 |
| 3,859,399 | 1/1975 | Bailey | 264/29 |

Primary Examiner—Paul R. Michl
Attorney, Agent, or Firm—Cushman, Darby & Cushman

[57] ABSTRACT

A ceramic article is prepared by injecting a raw composition including an organic binder and ceramic material in which the binder comprises 8 to 30 parts by weight of atactic polypropylene based on 100 parts by weight of said ceramic material, and heating a raw molded article thus obtained so that said binder is thermally decomposed and evaporated.

5 Claims, 11 Drawing Figures

FIG. 5 RELATIONSHIPS OF THE SPIRAL FLOW LENGTH TO THE PRESSURE AND TEMPERATURE OF INJECTION MOLDING

METHOD OF PRODUCING A CERAMIC ARTICLE BY INJECTION MOLDING

This is a division, of application Ser. No. 448,063 filed Mar. 4, 1974 now abandoned.

This invention relates to a method of producing a ceramic article by injection molding. Ceramic products include a special type manufactured from nonplasticizable material with or without a minute amount of clay mineral and a general type obtained from plasticizable material mainly consisting of clay mineral. The former type is used, for example, as dielectric articles, semiconductors, magnetic articles, piezoelectric articles, high melting sintered articles, high frequency insulators, special refractories, abrasives and precision casting cores. The latter type is made into, for example, common porcelain articles, impact-resistant porcelain articles and wear-resistant porcelain articles. These ceramic products have hitherto been molded by a die press, potter's wheel, extruder, casting, rubber press or hot press. Where, however, the raw material of ceramic products does not contain clay mineral imparting plasticity to the raw material or contains a minute amount of such clay material, then, for example, extrusion molding utilizing the plasticity of raw material is difficult to apply. Further, another process which does not rely on the plasticity of raw material is hardly adapted for manufacture of articles of complicated shape and those demanded to have a high dimensional precision or a uniform quality.

To eliminate the above-mentioned drawbacks accompanying the prior art processes, ceramic products have been manufactured by the process of injection molding which comprises first adding suitable organic substances such as thermoplastic resin, thermosetting resin, lubricant and plasticizer to raw material of ceramics to render it thermoplastic, producing shaped articles from said raw compound by injection molding, subjecting the added organic substances to thermal decomposition and evaporation and finally baking the raw mass into articles of complicated shape and high dimensional precision.

The Japanese Patent Publications 7883/61 and 13913/61 respectively set forth an injection molding composition including a mixture of thermoplastic resin such as styrene-butadiene copolymer, lubricant such as stearic acid and volatilizable plasticizer such as diethyl phthalate and that containing a mixture of styrene-butadiene copolymer and thermosetting resin.

The U.S. Pat. No. 2,593,507 discloses the injection molding process of ceramics which uses a polymer of mono-olefin such as polyethylene, polypropylene or polybutene. In this case, however, such binder has to be added in a large amount, and moreover application of a great deal of binder generally not only presents difficulties in its removal, but also causes the molded mass to have a low density after separation of the binder, thus making it difficult to control the dimensional change of the molded mass when sintered. In addition, removal of a large amount of the binder has the drawback of readily giving rise to the deformation of the molded mass. For improvement of the above-mentioned shortcomings, there have been proposed some other processes which consist in adding, for example, wax, phthalic acids, stearic acid or low-boiling oils to the raw material of ceramics so as to effect the required injection molding thereof with a small amount of binder. The United Kingdom Pat. No. 706,728 may be cited as an instance. This British Patent sets forth examples where a mixture of polystyrene, light oil and beeswax is added to raw powders of ceramics. However, when used in a large amount, the light oil tends to coagulate in injection molding. Further, since the light oil and resin jointly occupy a large volume, the molded mass is likely to decrease in density after removal of the additives. The above-mentioned British process is also unadapted for the injection molding of, for example, fine powders of clay due to a large requirement of oil. Another known injection molding process consists in using diethyl phthalate as a plasticizer in place of oil. Said another process is indeed well usable with raw powders of ceramics having a high tap density, but is unavailable for raw ceramic powders having a low tap density, particularly very fine powders thereof due to a considerable requirement of binder which is difficult to remove.

The U.S. Pat. No. 2,939,199 gives examples where thermosetting resin such as epoxy resin or phenolic resin is used in order to prevent the thermal deformation of a molded mass when a binder is removed therefrom. Application of such thermosetting resin is also unsuitable for the injection molding of minute raw powders of ceramics, because a large amount of such resin has to be added as in the case of ordinary thermoplastic resin. Moreover, it is impossible to recover and regenerate scraps such as those remaining in a sprue, sprue runner or sprue lock after injection molding. Therefore the process of this United States Patent gives rise to a prominent loss of raw powders of ceramics and consequently is unadapted to be applied to expensive raw material of ceramics, failing to attain quantity production.

Another U.S. Pat. No. 3,234,308 sets forth an injection molding composition, whose binder is formed of a sublimable substance, for example, naphthalene as a main component and gum shellac as an auxiliary component. However, the process of this United States Patent has the drawbacks that application of a sublimable substance such as naphthalene restricts the condition in which the raw components should be mixed and later subjected to injection molding; the molded mass is generally so brittle as to call for utmost care in handling; and treatment of naphthalene sublimated during removal of a binder raises problems.

Any of the prior art injection molding compositions requires a large amount of resin for injection molding of fine raw powders of ceramics, resulting in the deformation, cracks and blisters of a molded mass of ceramics after removal of the resin, and in the low dimensional precision of the molded mass when sintered, and consequently fails to be used in the injection molding of fine raw powders of ceramics. The known resin compositions have many other defects as previously described and do not prove fully satisfactory.

Where raw material of ceramics is subjected to injection molding with addition of a binder, it is demanded that the raw mass be possessed of proper thermal lfluidity and moldability and that the molded product be free from defects such as sink marks or cracks. It is further required that the added organic substance be slowly subjected to thermal decomposition and evaporation while the molded mass is being baked. This is a very important point, because the rapid decomposition and evaporation of the organic additive will give rise to the deformation, crumbling, cracks, blisters and foams of the molded product.

It is accordinly an object of the invention to provide a method of producing a ceramic article by injection molding, producing an excellent article without the aforesaid defects.

According to the invention, there is provided a method of producing a ceramic article by injection molding comprising the steps of:

injecting a raw composition including an organic binder and ceramic material in which the binder comprises 8 to 30 parts by weight of atactic polypropylene based on 100 parts by weight of said ceramic material, to produce a raw molded article and, heating said raw article so that said binder is thermally decomposed and evaporated.

This invention can be more fully understood from the following detailed description when taken in conjunction with the accompanying drawings, in which.

This invention originates with the discovery that even when added in a smaller amount than the prior art resin binder atactic polypropylene not only fully acts as a binder for raw material of ceramics but also can render the raw material of ceramics sufficiently fluid for injection molding and have the thermal decomposition rate more freely adjusted.

The atactic polypropylene (hereinafter abbreviated as "A.P.P.") used in this invention may consist of the type originally manufactured for its own sake or the type obtained as a by-product usually in an amount of about 5 to 10% in the production of stereoregular polypropylene. From the economic point of view, however, the latter type is preferred. Though not subject to any particular limitation, the molecular weight of the atactic polypropylene used in the invention generally ranges between 5000 and 120000.

Figure 1:
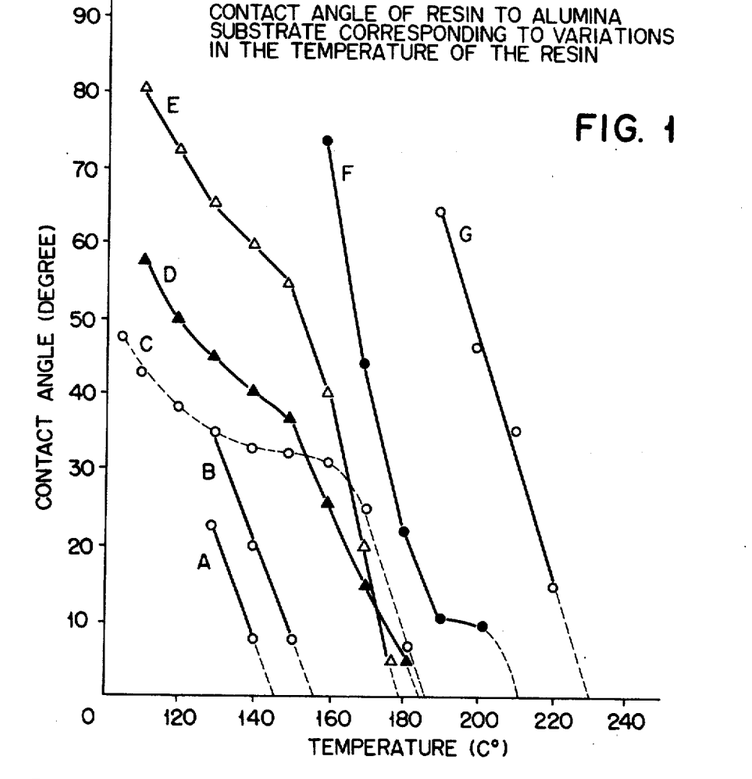
FIG. 1 is a curve diagram showing the relationship of the contact angle (or wettability) of various resins to an alumina substrate and the temperature of said resins.

FIG. 1 shows the relationship of the contact angle (or wettability) of various resins including atactic polypropylene to an alumina substrate and the temperature of said resins. The curves A, B, C, D, E, F and G respectively represent A.P.P. having a molecular weight of 10000 to 20000, A.P.P. having an average molecular weight of 60000, low-density polyethylene ethylene-vinyl acetate copolymer containing 30% of vinyl acetate, medium-density polyethylene, and polystyrene. As apparent from FIG. 1, A.P.P. has a far higher wettability than other resins, proving that the A.P.P. fully acts as a binder for raw material of ceramics in a smaller amount and at a lower temperature than other resins.

The raw material of ceramics used as the main constituent of an injection molding composition of this invention may be a plastic or nonplastic type or be in the form of fine powders.

Even when used in a small amount, the A.P.P. is not only effective as a binder for raw material of ceramics but also imparts better fluidity to the raw material than any prior art resin binder, as easily understood from the later described Example 1.

Further, the A.P.P. can have its heating weight loss freely adjusted by mixing proper amounts of a type of relatively low molecular weight and a type of relatively high molecular weight. This means that the removal by decomposition of a binder contained in the raw material of ceramics just after molded can be effected at a freely adjustable rate. Moreover, the addition of said A.P.P. to the raw material of ceramics can be properly controlled.

Figure 2:
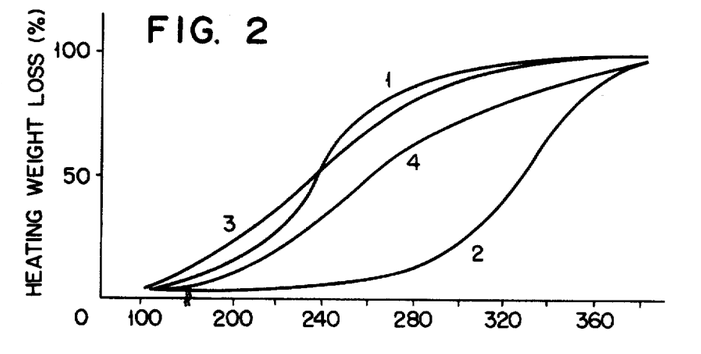
FIG. 2 is a curve diagram showing the heating weight loss of atactic polypropylene and other resins.

FIG. 2 is a curve diagram showing the heating weight loss of A.P.P. when increasingly heated in increments of 2° C per minute and those of other resins heated under the same conditions. The curve 1 represents A.P.P. having an average molecular weight of 60000 ±10000, showing that the A.P.P. is rapidly decomposed and evaporated over a temperature range from 200° to 260° C. The curve 2 denotes polyethylene, indicating that this resin is not prominently decomposed until temperature reaches 280° C, but suddenly displays decomposition and evaporation over a temperature range from 280° to 360° C. The curve 3 shows a mixture of a type of A.P.P. having an average molecular weight of 60000 ±10000 and another type of A.P.P. having a molecular weight of 10000 to 20000 fused together in the weight ratio of 10.2 to 4.1, showing that this mixture is decomposed and evaporated slowly, namely, almost linearly over a temperature range of 180° to 300° C.

As seen from FIG. 2, an article molded from the raw material of ceramics containing polyethylene as a binder presents foams or cracks or sometimes crumbles itself while the binder is being decomposed and evaporated, particularly where the article is thick and large. In contrast, an injection molded mass whose binder consists of the A.P.P. mixture represented by the curve 3 admits of the slow uniform decomposition and evaporation of the binder, even when the molded mass is thick and large and consequently is free from defects such as the deformation, blisters, cracks and foams of the mass. As described above, a mixture of A.P.P. types having different molecular weights can impart suitable thermal fluidity and moldability to raw material of ceramics when subjected to injection molding and moreover can have its thermal decomposition and evaporation rate freely adjusted, thus often eliminating the necessity of adding a lubricant or plasticizer to the raw material.

Addition of the A.P.P. binder to the raw material of ceramics should be determined in actual application in consideration of the kind of said raw material and, for example, the size or shape of particles of said raw powder.

Figure 3:
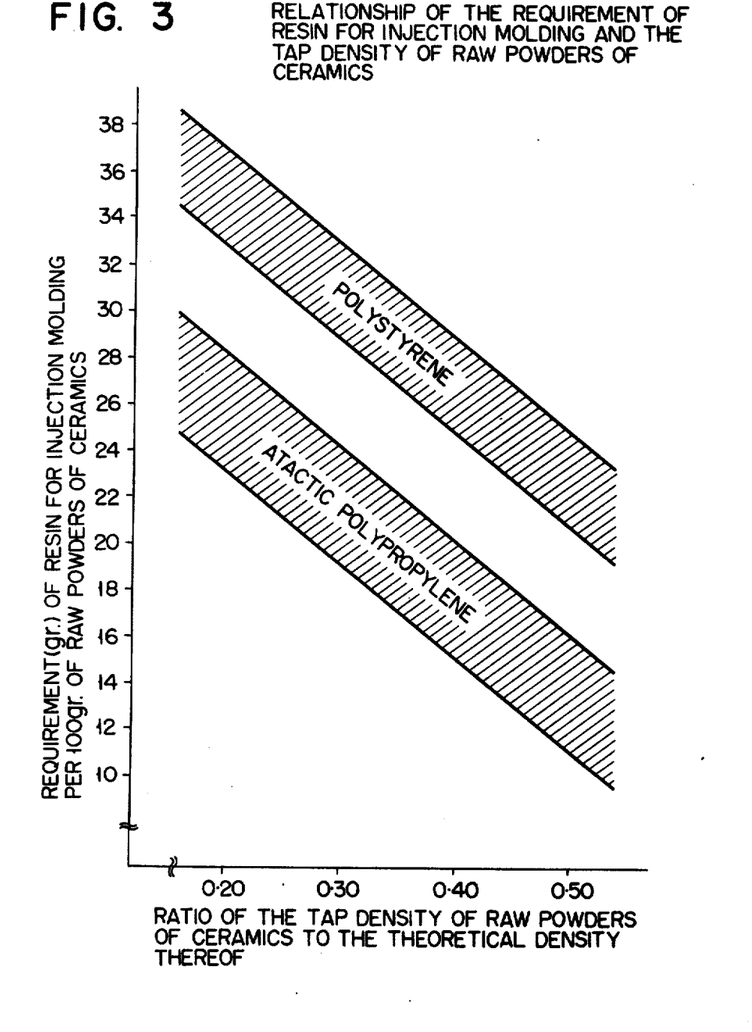
FIG. 3 presents the relationship of the ratio of the tap density to the theoretical density of raw material of ceramics and the required addition of atactic polypropylene and polystyrene relative to said ratio.

Addition of the A.P.P. binder may be defined, for example, in the following manner. The overall evaluation of raw powders of ceramics which should be injection molded is carried out by measuring the tap density to determine its ratio to the theoretical density and experimentally determining the requirement of the A.P.P. binder on the basis of said ratio. FIG. 3 shows the range of the effective addition of A.P.P. and polystyrene as a binder to 100 parts by weight of alumina powders determined in consideration of the ratio of the tap density to the theoretical density of said powders. The samples of alumina powders which were pulverized under varying conditions had different particle size distributions. The tap density of said powders was measured by the ordinary method. FIG. 3 clearly shows that the requirements of polystyrene and A.P.P. for the injection molding of raw material of ceramics are widely different as previously mentioned.

Too small addition of A.P.P. to raw material of ceramics prevents the uniform distribution of A.P.P. in the raw material, failing to impart required fluidity to the raw material for its injection molding. Conversely, excess incorporation of A.P.P. leads to the unduly high fluidity of the raw material, possibly giving rise to the occurrence of sink marks in the molded mass and in consequence irregular densities. Further, when such a large amount of A.P.P. is removed from the molded mass, blisters or cracks are likely to take place in the mass or the mass itself is destroyed. Moreover, said removal undesirably takes a considerably long time. Considerable addition of A.P.P. leads to the low density of a molded mass after removal of said binder and in consequence the prominent dimensional change or distortion of the molded mass when finally baked.

Though, as previously described, proper addition of A.P.P. to provide a good molded article free from the above-mentioned defects may vary with the kind of raw material of ceramics and the size or shape of particles of said raw powder, the preferred addition of A.P.P. generally falls within the range of 8 to 30 parts by weight based on 100 parts by weight of said raw material.

It has further been found that a more effective injection molding composition can be provided when the composition of this invention contains not only A.P.P. but also 3 to 15 parts by weight of other thermoplastic resins. As used herein, the term "thermoplastic resin" is defined to mean isotactic and syndiotactic polypropylene excluding the atactic type and other thermoplastic resins regardless of the type.

A mixture of A.P.P. and said thermoplastic resin used as a binder is more effective for proper control of the thermal decomposition rate of said mixture. The curve 4 of FIG. 2 shows the heating weight loss of a mixture of A.P.P. having an average molecular weight of 60000 ± 10000 and A.P.P. having a molecular weight of 10000 to 20000 and polyethylene fused together in the weight ratio of 9:3:5. The curve 4 shows that the mixture is decomposed and evaporated slowly, namely, almost linearly over a temperature range of 200° to 380° C. Actually, a good ceramic product is obtained from the raw material containing said mixture as a binder.

Joint use of A.P.P. and the above-defined thermoplastic resin is effective to prevent the deformation of a molded mass, control its hardness and improve its surface condition and also enables the molded mass itself to be easily released from a mold.

The aforesaid thermoplastic resins include polyolefins such as polyethylene and polypropylene (excluding the atactic type); copolymers of ethylene and vinyl such as ethylenevinyl acetate copolymer; poylstyrene; and polymethacrylate.

The injection molding composition of this invention for ceramic products admits of incorporation of 5 parts by weight of a plasticizer or lubricant and 10 parts by weight at maximum of both additives.

Figure 4:
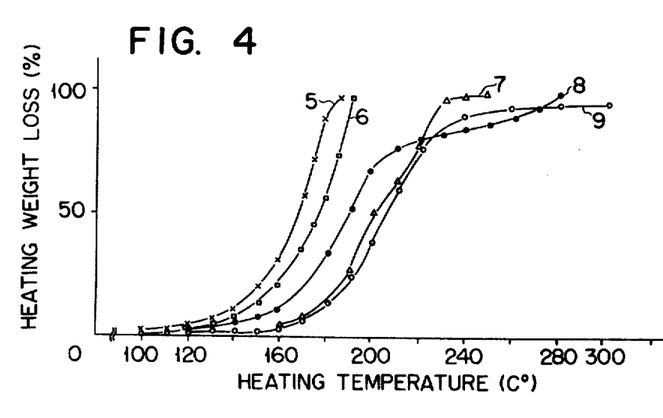
FIG. 4 is a curve diagram showing the heating weight loss of various plasticizers and lubricants.

The plasticizers include diethyl phthalate (DEP), dibutyl phthalate (DBP), dioctyl phthalate (DOP) and diallyl phthalate (DAP). The lubricants include stearic acid, paraffin wax and ester wax. FIG. 4 is a curve diagram showing the heating weight losses of the typical ones of those additives, when the additives were heated in increments of 2° C per minute. The curves 5, 6, 7, 8 and 9 represent the heating weight losses of DEP, DBP, DOP, stearic acid and paraffin wax. As apparent from FIG. 4, all these additives commence decomposition and evaporation at a lower temperature than the A.P.P. binder. Accordingly, incorporation of any of these additives enables the heating weight loss of the injection molding composition of this invention to be easily controlled.

The above-mentioned plasticizers and lubricants have good solubility in the A.P.P. binder. Therefore, addition of any of said plasticizers and lubricants increases the fluidity of said injection molding composition and decreases the requirement of a binder resin by that extent.

A plasticizer of diethyl phthalate and a lubricant of stearic acid and a low solubility in a binder of polystyrene contained in a prior art injection molding composition for ceramic products, and migrated over the surface of an injection molded mass. Moreover, the low fluidity of such composition often caused the trace of said migration to be retained after the final baking of the molded mass. In contrast, the injection molding composition of this invention containing the A.P.P. binder is free from such drawbacks, because the additives of plasticizers and lubricants have good solubility in the A.P.P. binder, thus enabling the molded mass to present a smooth surface after baked.

For the object of this invention, the requirements of a plasticizer and lubricant are set at 5 parts by weight at maximum when either type of additive is used and at 10 parts by weight at maximum when both types of additive are applied. Incorporation of said additives in an injection molding composition in excess of these limits gives rises to the deformation and low mold releasability of a molded mass and the appearance of sink marks on the surface of said mass, though elevating the moldability of said composition. Since this means that a large amount of low volatile components is present in the injection molding composition, the maintenance of the composition at a low temperature for removal of said organic substances has to be continued for a longer time by that extent, namely, elimination of all said organic substances takes a great deal of time. In such case, the drawbacks take place that the molded mass is likely to present blisters, cracks or fissures and, after baked, indicates a prominent shrinkage.

It is advised that removal of organic substances contained in a mass molded from the injection molding composition of this invention for ceramic products be generally effected by heating the molded mass from room temperature to a level ranging from 100° to 140° C in about 2 hours and further heating the mass to 340° to 380° C in increments of 3° to 10° C per hour. Thereafter, the molded mass is finally baked to provide a ceramic product.

It will be noted that the proportions of the aforesaid organic substances added to raw powders of ceramics should be suitably determined, as previously described, within the range of 8 to 30 parts by weight based on 100 parts by weight of said raw powders and according to the density and particle size and shape of said powders, the desired shape of a molded product, and the conditions in which the composition is injection molded and thereafter the molded mass is heat treated.

This invention will be more fully understood by reference to the examples which follow.

EXAMPLE 1

An injection molding composition H according to this invention for ceramic products was prepared by adding a mixture of 10 parts by weight of atactic polypropylene having a density of 0.9 and an average molecular weight of 60000 and 3.8 parts by weight of atactic polypropylene having a density of 0.86 and a molecular weight of 10000 to 20000 to 100 parts by weight of raw alumina powders for porcelain consisting of 84.6% $Al_2O_3$, 3.6% $CaCO_3$, 9.1% gairome clay (a kind of kaolin clay) and 2.7% $Cr_2O_3$ and having a density of 3.7, the smaller particle size of said powders than 5 microns accounting for 60%.

A prior art injection molding composition I was prepared by adding a mixture of 15 parts by weight of polystyrene having a density of 1.04, 4.9 parts by weight of stearic acid having a density of 0.847 and 2.45 parts by weight of diethyl phthalate having a density of 1.121 to 100 parts by weight of alumina powders having the same composition as described above. A spiral flow test was made of both compositions H and I by injecting them into a spiral flow test die at temperatures of 140°, 160° and 180° C under various pressures to determine the spiral flow lengths of said compositions H and I. Throughout the test, a ½ ounce injection molder was used with the die temperature set at 15° to 20° C and the nozzle inner diameter set at 2.5 mm.

Figure 5:
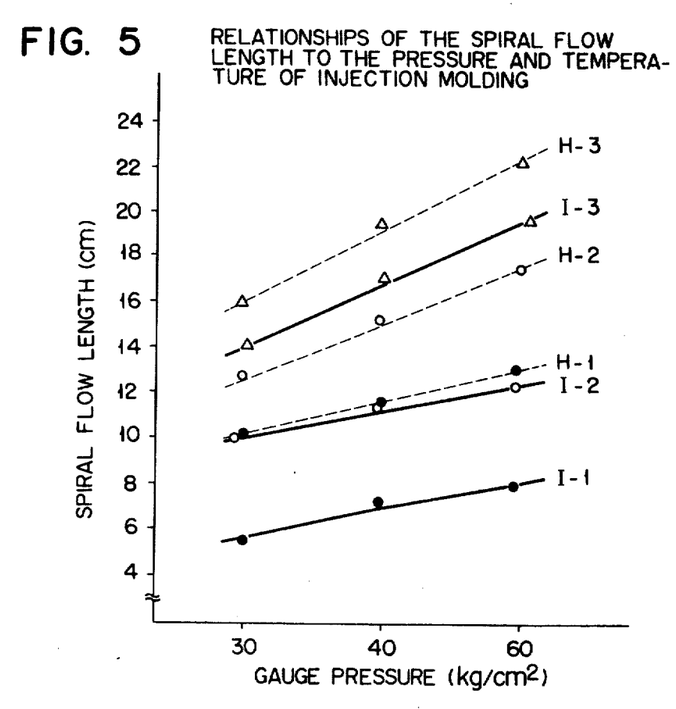
FIG. 5 indicates the spiral flow lengths of injection molding composition containing atactic polypropylene or polystyrene as a binder when the compositions are injection molded under the same conditions.

The results of the test are presented in FIG. 5. Referring to this figure, the character H represents the composition H of this invention and the character I the prior art composition I. The numbers 1, 2 and 3 suffixed to said characters denote the injection molding temperatures of 140°, 160° and 180° C. As apparent from FIG. 5, the prior art composition I showed a much shorter spiral flow length than the composition H of this invention, though containing a larger amount of organic substances, providing that the prior art composition I had a lower thermal fluidity. In other words, it is seen that the A.P.P. binder of this invention can render raw material of ceramics more thermally fluid than the prior art binder, though used in a smaller amount.

EXAMPLE 2

An injection molding composition was prepared by adding a mixture of 10.2 parts by weight of A.P.P. having an average molecular weight of 60000 ± 10000 and 4.1 parts by weight of A.P.P. having an average molecular weight of 10000 to 20000 to 100 parts by weight of raw material of ceramics consisting of 93% alumina, 5% talc, 2% clay, having a density of 3.8 and a tap to theoretical density ratio of 0.43, said raw material being crushed in a wet state in a ball mill and later dried into powders, and followed by pulverizing the mixture to a smaller particle size than 3 mm after kneaded at 170° to 180° C.

The composition was injection molded into a flat plate 3 mm thick, 25 mm wide and 100 mm long with the molding temperature set at 140° to 180° C and the injection pressure at 800 to 1200 kg/cm². The flat plate thus molded was heated from 70° to 350° C in increments of 3° to 4° C per hour for the decomposition and evaporation of the organic substances contained therein. The plate was finally baked at 1600° C to provide an alumina porcelain article. This porcelain plate was determined to have a specific gravity of 3.6 and bending strength of 2600 kg/cm², proving that the plate did not present any inferior properties to a porcelain plate press molded from the same composition as above-described free from the A.P.P. binder. Where the injection molding composition of this invention was further mixed with 2 parts by weight of stearic acid as a lubricant and 1 part by weight of diethyl phthalate as a plasticizer, still the same result was obtained as in the preceding case.

EXAMPLE 3

7.9 parts by weight of A.P.P. having an average molecular weight of 60000 ± 10000, 2.7 parts by weight of A.P.P. having a molecular weight of 10000 to 20000 and 4.4 parts by weight of high-density polyethylene having a melt index of 30 were added to 100 parts by weight of inorganic raw material of ceramics prepared in Example 1. The mixture was thermally kneaded at 160° to 180° C, followed by cooling and later pulverized into powders having a maximum particle size of less than 1mm to be used as a composition for injection molding.

Figure 6A:
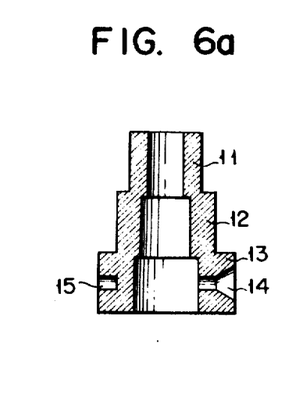
FIGS. 6 to 9 show the shapes of articles produced by the injection molding of the composition of the invention.

The composition was injection molded at 160° to 180° C and injection pressure of 950 to 1300 kg/cm² into 3-stage columnar burner nozzle as illustrated in FIG. 6a which had progressively increasing wall thicknesses at the sections 11, 12 and 13 as counted in the order mentioned, the maximum wall thickness measuring 5 to 7 mm. The section 13 of said burner nozzle was penetrated throughout by a horizontal round hole as indicated by numeral 14, and was bored with a horizontal round hole extending from the outside to the half of the wall thickness of said section 13 as indicated by numeral 15.

Figure 6B:
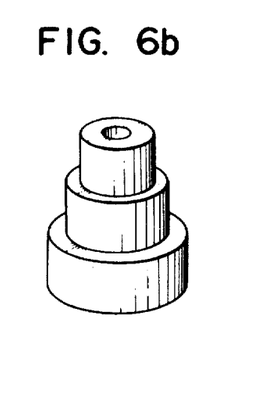

The molded mass was heated from room temperature to 100° C in 2 hours and further heated up to 360° C in increments of 3° to 4° C per hour for the decomposition and evaporation of the organic additives contained in the mass and finally baked at 1600° C, providing a high quality burner nozzle. FIG. 6b is an oblique view of said nozzle.

Where the high-density polyethylene was replaced by low-density polyethylene or ethylene-vinyl acetate copolymer, still the same result was obtained. Also were 1 part by weight of stearic acid as a lubricant and 2 parts by weight of dibutyl phthalate as a plasticizer were added to the above-mentioned compositions, the fluidity of the composition and the mold releasability of the molded mass were elevated, still obtaining as good results as in the preceding case.

EXAMPLE 4

Figure 7:
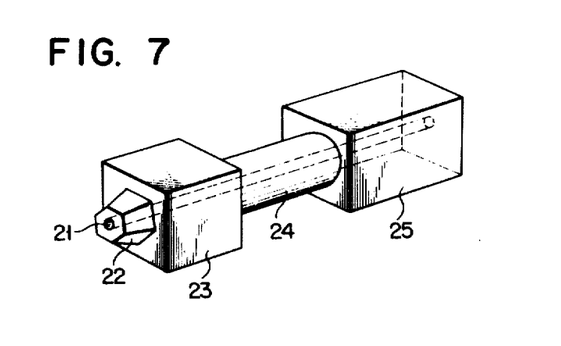

13.2 parts by weight of A.P.P. having an average molecular weight of 80000 ± 10000, 4.4 parts by weight of A.P.P. having a molecular weight of 10000 to 20000 and 7.5 parts by weight of ethylene-vinyl acetate copolymer containing 14% vinyl acetate were added to 100 parts by weight of inorganic raw porcelain powders consisting of 60% pottery stone, 23% gairome clay (a kind of kaolin clay) and 17% feldspar. The mixture was thermally kneaded at 160° to 180° C and later pulverized into powders having a maximum particle size of less than 3 mm to be used as an injection molding composition which was later injection molded into a gas igniting plug as illustrated in FIG. 7 showing an oblique view thereof. Referring to the construction of the plug, numeral 21 denotes a round pole penetrating the plug at the center, the section 22 is a hexagonal or octagonal cone, the sections 23, 25 are cubic or pallalelipiped members, and the section 24 is a round columnar member.

Injection molding was carried out under the same conditions as in Example 2. The molded mass was heated from room temperature to 70° C in 3 hours and further heated up to 370° C in increments of 3° to 4° C per hour for the decomposition and evaporation of the organic substances contained in the mass, and finally baked at 1280° C, providing a high quality product.

Where 0.1 part by weight of stearic acid as a lubricant and 0.1 part by weight of diethyl phthalate as a plasticizer were added to the above-mentioned composition the fluidity of said composition and the mold releasability of the molded mass were improved, still giving as satisfactory results as in the preceding case.

EXAMPLE 5

22.5 parts by weight of A.P.P. having an average molecular weight of 60000 ± 10000, 7.0 parts by weight of A.P.P. having a molecular weight of 10000 to 20000 and 13.0 parts by weight of high-density polyethylene having a melt index of 30 were added to 100 parts by weight of silica glass powders having a density of 2.1 and a tap to theoretical density ratio of 0.12. The mixture was kneaded at 160° to 180° C, followed by cooling and later pulverized into powders having a maximum particle size of less than 1 mm to be used as an injection molding composition. This composition was injection molded into the same product (FIG. 7) as in Example 4 at 160° to 180° C and injection pressure of 950 to 1300 kg/cm$^2$.

The molded mass was heated from room temperature to 100° C in 2 hours and further heated up to 360° C in increments of 3° to 4° C per hour for the decomposition and evaporation of the organic substances contained in the mass and finally baked at 1200° C, providing a good product. Where 5.0 parts by weight of stearic acid as a lubricant and 2.5 parts by weight of dibutyl phthalate were added to the above-mentioned composition, the fluidity of said composition and the mold releasability of the molded mass were increased, still giving as good results as in the preceding case.

EXAMPLE 6

5.0 parts by weight of A.P.P. having an average molecular weight of 60000 ± 10000, 2.0 parts by weight of A.P.P. having a molecular weight of 10000 to 20000, 1.0 part by weight of stearic acid as a lubricant and 0.2 part by weight of diethyl phthalate as a plasticizer were added to 100 parts by weight of piezoelectric material having a density of 7.7 and a tap to theoretical density ratio of 0.55, said piezoelectric material being prepared by mixing 68.5% lead monoxide, 20.0% zirconia and 11.5% titanium dioxide and later pulverizing the mixture in a wet state in a ball mill, followed by baking at 850° C and pulverization. The above-mentioned mass was kneaded at 170° to 180° C and later pulverized into powders having a maximum particle size of less than 3 mm to be used as an injection molding composition.

This composition was injection molded into a flat plate 3 mm thick, 25 mm wide and 100 mm long at 140° to 180° C and injection pressure of 1000 to 1200 kg/cm$^2$. The molded mass was heated from 150° to 380° C in increments of 3° to 4° C per hour for the decomposition and evaporation of the organic substances contained in the mass and finally baked to 1280° C, providing a high quality porcelain piezoelectric product.

EXAMPLE 7

100 parts by weight of raw powders of ceramics consisting of 95% Al$_2$O$_3$ and 5% CaCO$_3$ having a density of 3.8 and a tap to theoretical density ratio of 0.49, the smaller particle size of said powders than 5 microns accounting for 60%, 10 parts by weight of A.P.P. having a molecular weight of 10000 to 20000, 2 parts by weight of stearic acid and 1 part by weight of diethyl phthalate were mixed and kneaded 1 to 2 hours at 170° to 180° C. The mixture was pulverized into powders having a maximum particle size of less than 3 mm to be used as an injection molding composition.

Figure 8A:
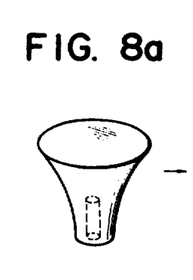
Figure 8B:
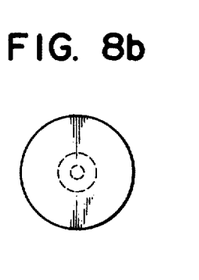

This composition was injection molded at 160° to 200° C and injection pressure of 800 to 1200 kg/cm$^2$ into a flat plate 3 mm thick, 25 mm wide and 1000 mm long and also into a round conical chip illustrated in FIG. 8a (FIG. 8b showing the plan view thereof). The molded masses were heated from 70° to 350° C in increments of 3° to 4° C per hour for the decomposition and evaporation of the organic substances contained in the masses, and finally baked at 1650° C, obtaining high quality alumina porcelain articles.

EXAMPLE 8

100 parts by weight of raw powders of ceramics consisting of 84.6% Al$_2$O$_3$, 3.6% CaCO$_3$, 9.1% gairome clay (a kind of kaolin clay) and 2.7% Cr$_2$O$_3$, having a density of 3.7 and a tap to theoretical density ratio of 0.43, the smaller particle size of said powders than 5 microns accounting for 60%, 6 parts by weight of high-density polyethylene having a density of 0.96 and 12 parts by weight of A.P.P. having a molecular weight of about 5000 were kneaded together 1 to 2 hours at 170° to 180° C. The mixture was pulverized into powders to be used as raw material of injection molding.

Figure 9:
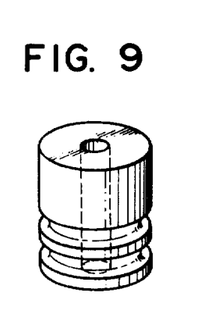

This raw material was injection molded at 160° to 180° C and injection pressure of 600 to 1000 kg/cm$^2$ into an insulator having a maximum thickness of 5 to 7 mm as illustrated in FIG. 9 and also into a burner nozzle having a maximum thickness of 6 to 8 mm as shown in FIG. 6. These molded masses were heated from 100° to 370° C in increments of 3° to 4° C per hour for the decomposition and evaporation of the organic substances contained in the masses, and finally baked at 1650° C, providing high quality ceramic articles.

Further, the following groups of injection molding compositions gave as good results as the above-mentioned composition.

| Group A: | Parts by weight |
| --- | --- |
| Same raw powders of ceramics as described above | 100 |
| High-density polyethylene or stere regular polypropylene having a density of 0.95 | 5.45 |
| Atactic polypropylene having a Molecular weight of about 5000 | 10.91 |
| Stearic acid | 0.27 |
| Diethyl phthalate | 0.09 |
| Group B: | |
| Same raw powders of ceramics as described above | 100 |
| Polypropylene | 6.75 |
| High-density polyethylene having a density of 0.95 | 2.25 |
| Atactic polypropylene having | |

| a molecular weight of about 5000 | 9.00 |

EXAMPLE 9

100 parts by weight of raw powders of ceramics consisting of 85% TiO$_2$ and 15% pottery stone having a specific gravity of 3.8 and a tap to theoretical density ratio of 0.16, the smaller particle size of said powders than 5 microns accounting for 94%, 12.3 parts by weight of high-density polyethylene having a density of 0.955, 14.2 parts by weight of A.P.P. having an average molecular weight of 60000, 4.5 parts by weight of A.P.P. having a molecular weight of 10000 to 20000, 0.5 part by weight of stearic acid and 0.1 part by weight of diethyl phthalate were kneaded together 1 to 2 hours at 170° to 180° C. The mixture was pulverized into powders having a maximum particle size of 3 to 4 mm to be used as an injection molding composition.

This composition was injection molded into a porcelain spinning carrier (not shown) at 160° to 200° C and injection pressure of 1000 to 1200 kg/cm$^2$. The molded mass was heated from 100° to 350° C in increments of 3° to 4° C per hour for the decomposition and evaporation of the organic substances contained in the mass, and finally baked at 1280° C, providing a high quality porcelain article.

The high-density polyethylene included in the above-mentioned composition may be replaced by stereoregular polypropylene or ethylene-vinyl acetate copolymer.

EXAMPLE 10

100 parts by weight of raw powders of ceramics consisting of 76.4% zirconia, 6.9% feldspar, 9.8% talc, 4.9% wooden kibushi clay (a kind of kaolin clay) and 2.0% dolomite, having a density of 3.8 and a tap to theoretical density ratio of 0.37, the smaller particle size of said powders than 5 microns accounting for 60%, 6 parts by weight of high-density polyethylene having a density of 0.96, 9 parts by weight of A.P.P. having an average molecular weight of 60000, 3 parts by weight of A.P.P. having a molecular weight of 10000 to 20000, 0.1 part by weight of stearic acid and 0.1 part by weight of diethyl phthalate were kneaded together 1 to 2 hours at 170° to 180° C and pulverized into powders to be used as an injection molding composition. This composition was injection molded at 170° to 200° C and injection pressure of 750 to 1000 kg/cm$^2$ into a thermal shock-resisting porcelain article. The molded mass was heated from 100° to 360° C in increments of 3° to 4° C per hour for the decomposition and evaporation of the organic substances contained in the mass and finally baked at 1300° C, providing a high quality ceramic product.

EXAMPLE 11

100 parts by weight of raw powders of general porcelain consisting of 60% pottery stone, 17% feldspar, 23% gairome clay (a kind of kaolin clay) and having a tap to theoretical density ratio of 0.25, 8 parts by weight of medium-density polyethylene having a density of 0.94 to 0.93, 16.2 parts by weight of A.P.P. having an average molecular weight of 60000, 5.4 parts by weight of A.P.P. having a molecular weight of 10000 to 20000, 1.0 part by weight of stearic acid and 0.5 part by weight of diethyl phthalate were kneaded together 2 to 3 hours at 170° to 180° C. The mixture was pulverized into powders having a maximum particle size of 3 to 4 mm to be used as an injection molding composition.

This composition was injection molded at 140° to 170° C and injection pressure of 600 to 1000 kg/cm$^2$ into a gas igniting plug as illustrated in FIG. 7. The molded mass was heated from 80° to 360° C in increments of 3° to 4° C per hour for the decomposition and evaporation of the organic substances contained in the mass, and finally baked at 1280° C, providing a high quality ceramic product. The above-mentioned composition was also applicable in manufacturing other electrical parts.

In all the preceding examples, raw material of ceramics only consisted of oxides. However, nitrides, carbides and horides may also be used as raw material of ceramics.

What we claim is:

1. A method of producing a ceramic article by injection molding comprising the steps of:
   injecting a raw composition including an organic binder and ceramic material in which the binder comprises 8 to 30 parts by weight of atactic polypropylene based on 100 parts by weight of said ceramic material, to produce a raw molded article and,
   heating said raw article so that said binder is thermally decomposed and evaporated.

2. A method according to claim 1 wherein the molecular weight of said atactic polypropylene is 5000 to 120,000.

3. A method according to claim 2 wherein said binder further includes 3 to 15 parts by weight of at least one thermoplastic resin other than said atactic polypropylene.

4. A method according to claim 2 wherein said binder further includes up to 10 parts by weight of at least one of plasticizer and a lubricant.

5. A method according to claim 3 wherein said binder further includes up to 10 parts by weight of at least one of plasticizers and lubricants.

* * * * *

UNITED STATES PATENT OFFICE
CERTIFICATE OF CORRECTION

Patent No. 4,000,110      Dated December 28, 1976

Inventor(s) Saito et al

It is certified that error appears in the above-identified patent and that said Letters Patent are hereby corrected as shown below:

The addresses of the Assignees should read as follows:

--Kyoto-shi, Japan, Kyoto-shi, Japan, and

Kawasaki-shi, Japan, respectively--

Signed and Sealed this

Twenty-fifth Day of October 1977

[SEAL]

Attest:

RUTH C. MASON  
*Attesting Officer*

LUTRELLE F. PARKER  
*Acting Commissioner of Patents and Trademarks*